United States Patent
Krietzman et al.

[11] Patent Number: 5,870,971
[45] Date of Patent: Feb. 16, 1999

[54] MULTI-APERTURED FELINE TOY AND EXERCISE DEVICE

[76] Inventors: Mark Howard Krietzman; Yu-Hsin Chen, both of 25550 Hawthorne Blvd., Suite 101, Torrance, Calif. 90505

[21] Appl. No.: 909,534

[22] Filed: Aug. 12, 1997

Related U.S. Application Data

[60] Provisional application No. 60/024,217 Aug. 15, 1996.

[51] Int. Cl.[6] .................................................. A01K 15/02
[52] U.S. Cl. ............................................................. 119/707
[58] Field of Search .................................... 119/707, 708, 119/709, 710, 711, 706; 446/419; 473/594; D30/160

[56] References Cited

U.S. PATENT DOCUMENTS

| | | | |
|---|---|---|---|
| D. 335,554 | 5/1993 | Conner | D30/160 |
| 2,718,873 | 9/1955 | Buckner | 119/711 |
| 3,315,640 | 4/1967 | Gamble | 119/707 |
| 4,722,299 | 2/1988 | Mohr | 119/707 |
| 5,165,363 | 11/1992 | McGinty | 119/707 X |
| 5,357,905 | 10/1994 | Gordon | 119/708 |
| 5,390,629 | 2/1995 | Simone | 119/711 |
| 5,536,007 | 7/1996 | Snyder | 119/709 X |

*Primary Examiner*—Terry Lee Melius
*Assistant Examiner*—Yvonne R. Abbott
*Attorney, Agent, or Firm*—Mark Krietzman

[57] ABSTRACT

A multi-apertured enclosure having one or more rolling target objects located therein. A plurality of slotted openings, of a fixed maximum diameter, which provide access for multiple cat paws, at a great variety of angles and configurations to attack the targets, external replaceable targets, scratching surfaces and refillable catnip dispensing reservoirs may be added which encourage the cat to play on its own.

18 Claims, 3 Drawing Sheets

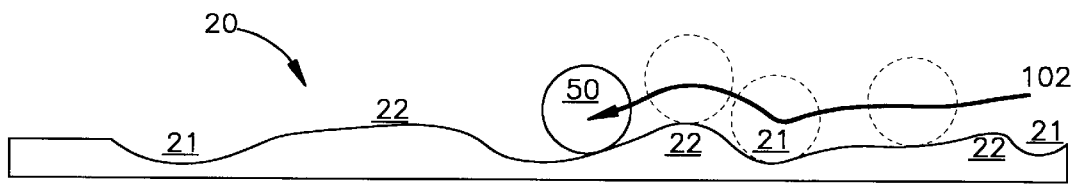
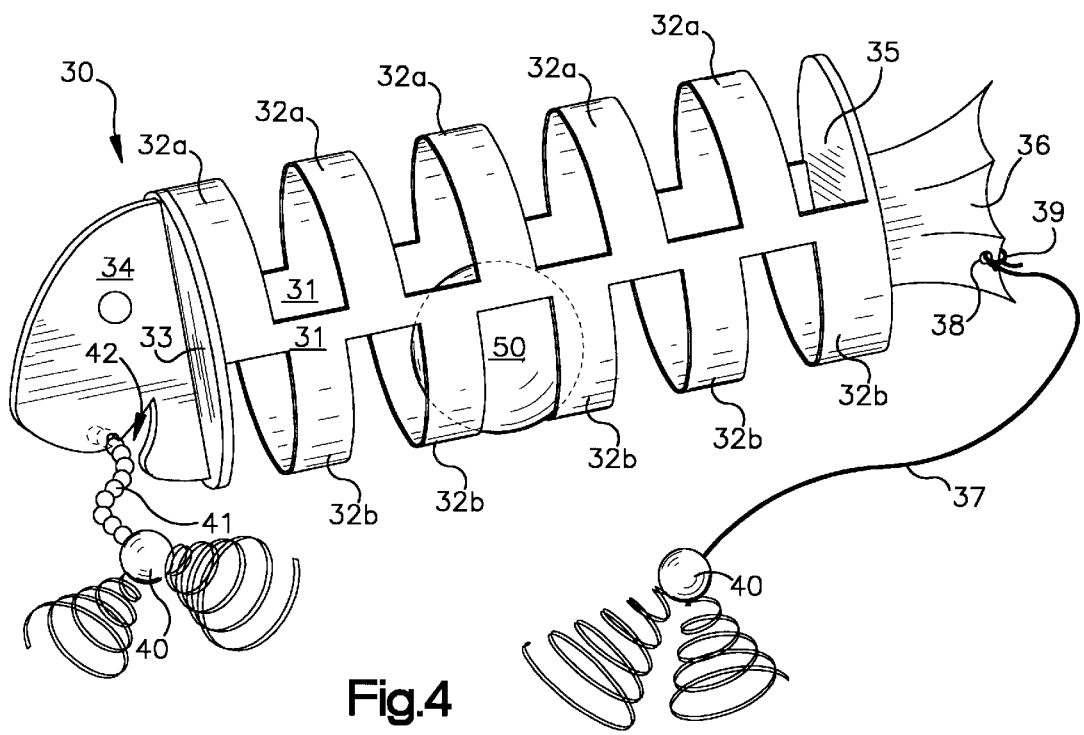

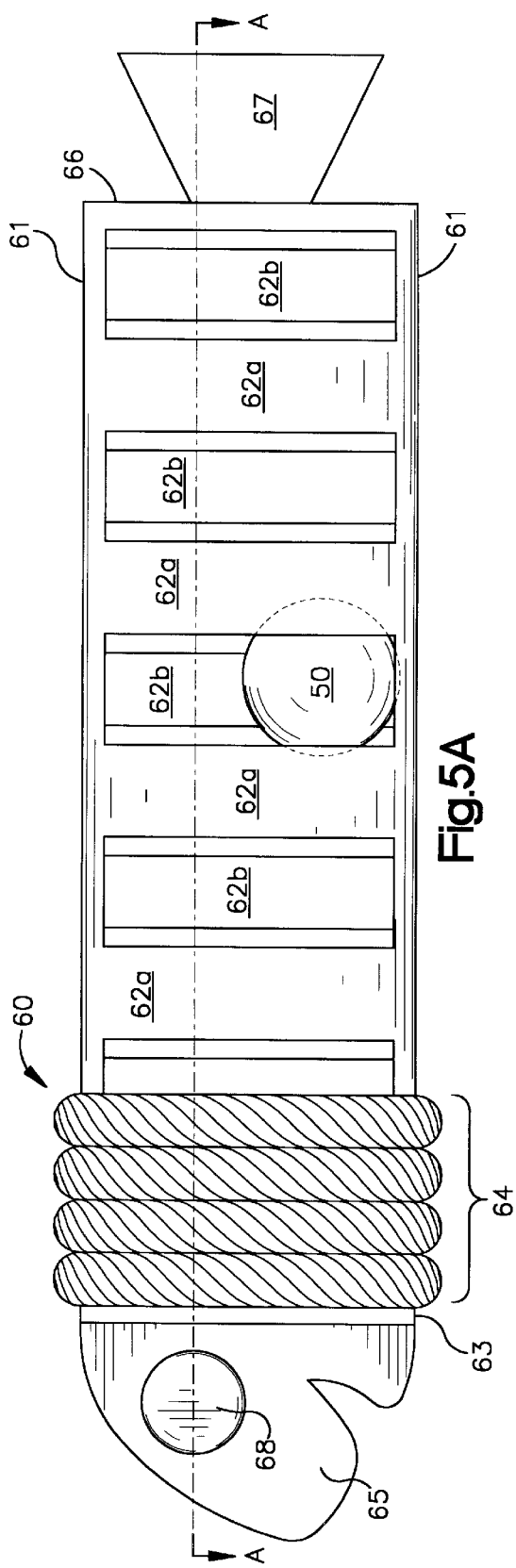
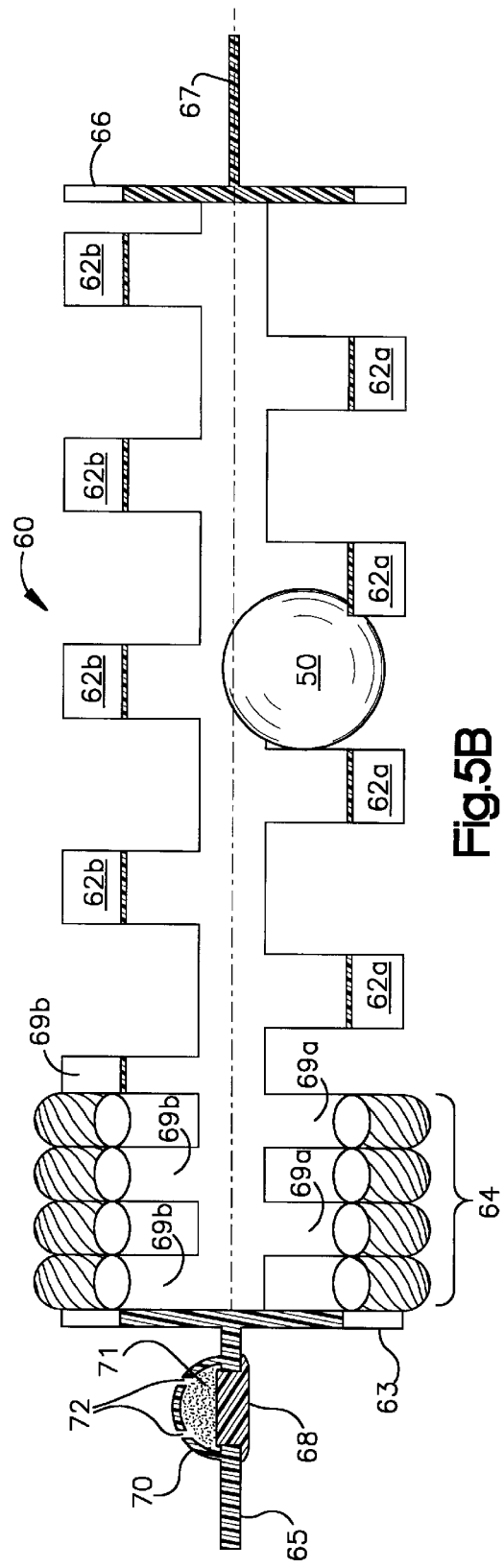

MULTI-APERTURED FELINE TOY AND EXERCISE DEVICE

RELATED APPLICATIONS

The within invention claims the benefit under Tile 35, United States Code § 119 (e), of Provisional Application 60/024,217, filed Aug. 15, 1996.

TECHNICAL FIELD OF THE INVENTION

This invention relates to pet toys & exercise devices more particularly, to a novel toy and exercise device for cats which provides a rolling ball target within a dome shaped enclosure into which a cat may insert one or more of is paws, and push, batter, roll or lift upward, the ball target, from a variety of angles through a plurality of arching openings, a non-level base increases the erratic movement of the rolling ball target. A rolling form also allows for the cat to attack the device from a variety of angles and provides the additional enticement of multi-dimensional movement across the floor.

There has long been a need for such a toy and exercise device of this type which engages a cat to "play on is own" and provides valuable exercise for the cat, which may alleviate boredom and destructive behavior.

BACKGROUND ART

Track-ball enclosures are well known in the art. Most fixed track-ball enclosures define the rolling area of the large to a pre-determined track usually circular and provide various fixed access openings to the internal track. Those familiar with cats will observe that the movement of a rolling large ball, in predefined track, is repetitive and predictable and is easily mastered by the cat with boredom following mastery.

Other enclosures allow for a larger free rolling area but do not encourage the lifting of the target against the sides and tops of the enclosure. Container based targets, confined to less rigid tracks providing removable targets are also prone to the loss of the target once the cat remove it or loss of interest by the cat if the target is not easily located within.

U.S. Pat. No. 4,722,299, issued to Mohr, and U.S. Pat. No. 5,009,193, issued to Gordon, and U.S. Pat. No. DES 335,554 issued to Conner, teach pet toys consisting of a hollow hoop, or other predefined track in which a ball is placed. The cat can reach at and attack the ball through a slot provided in the hoop. The cats attack will cause the ball to roll within the confines of the hoop, track or figure "8". These inventions are limited by the shape and size of the track. The play within the limitations of the track may become repetitive and cats may lose interest. U.S. Pat. No. 5,269,261, issued to McCance, teaches another tightly restricted circular track containing a target object.

U.S. Pat. No. 4,438,727, issued to Gommelt, teaches a pet toy consisting of a covered hollow cylindrical container with a concave top having a central opening through which a ball, once properly dropped by a human counterpart, may spiral or "funnel" around to the central opening In the concave top. An inherent limitation in this type of device is the need for a human counter-part to repeatedly place the ball on the concave lid to initiate the balls action. Additionally, because the ball is not easily viewed by the cat, the cat may lose interest when the ball is inside the container.

None of the solutions provide a simple, attractive, durable dome shaped to cylindrical target enclosure providing variable access to the interior, from a plenitude of angles and orientations. None promote three dimensional play with the target through a voluminous interior of the enclosure and elongated arched openings. The easy variable access to the ball target coupled with the volume creating a three dimensional play area for the confined target(s) supports the cats natural instinct to lift and toss is prey and encourages prolonged play and exercise.

SUMMARY OF THE INVENTION

Accordingly, it is an object of the present invention to provide a novel pet toy and exercise device for amusing pet animals such as cats.

It is yet another object of the invention to provide a hollow multi-aperture container forming essentially a dome or arched shape, with one or more free rolling target objects within.

It is yet another object of the invention to provide a hollow multi-aperture container, forming essentially a cylindrical shape, with one or more free rolling target objects within.

It is yet another object of the invention to provide a weighted, hollow multi-aperture container, forming a dome shape of a height adequate to allow a cat to draw the free rolling target against the guiding edges of two apertures and raise and drop the free rolling target objects.

It is yet another object of the invention to provide a hollow multi-aperture container, with one or more free rolling target objects within, which resembles a fish.

It is yet another object of the invention to provide a hollow multi-aperture container, with a face grooming and scratching surface.

It is yet another object of this invention to provide an interior configuration of the multi-aperture container which will cause the moving target object to bounce or roll randomly throughout the interior when engaged by a cat to further taunt the cat to play.

It is yet another object of this invention to provide an interior configuration of the multi-aperture container which will cause the moving target object to bounce or roll to or from the periphery.

It is yet another object of the invention to provide a rolling play and exercise device.

It is yet another object of the invention to provide a rolling scratchable corrugated cardboard and catnip dispensing play and exercise device.

It is yet another object of this invention to provide a container, which dispenses catnip or other natural cat attractant when rolled.

It is yet another object of this invention to provide a off-set cylindrical outer surface which will roll erratically across a floor.

The features of the invention believed to be novel are set forth with particularity in the appended claim. The invention itself, however both as to configuration, and method of operation, and the advantages thereof, may be best understood by reference to the following descriptions taken in conjunction with the accompanying drawings.

BRIEF DESCRIPTION OF THE DRAWINGS

FIG. 3 illustrates a cut-away side view of an alternate embodiment of the base of the multi-apertured feline toy & exercise device.

FIG. 4 illustrates a perspective view of an alternate embodiment of the device.

FIG. 5A illustrates a side view of an alternate embodiment of the device.

FIG. 5B illustrates a cut away top view, at line A—A of the embodiment of FIG. 5A.

MODES FOR CARRYING OUR THE INVENTION

Figure 1:
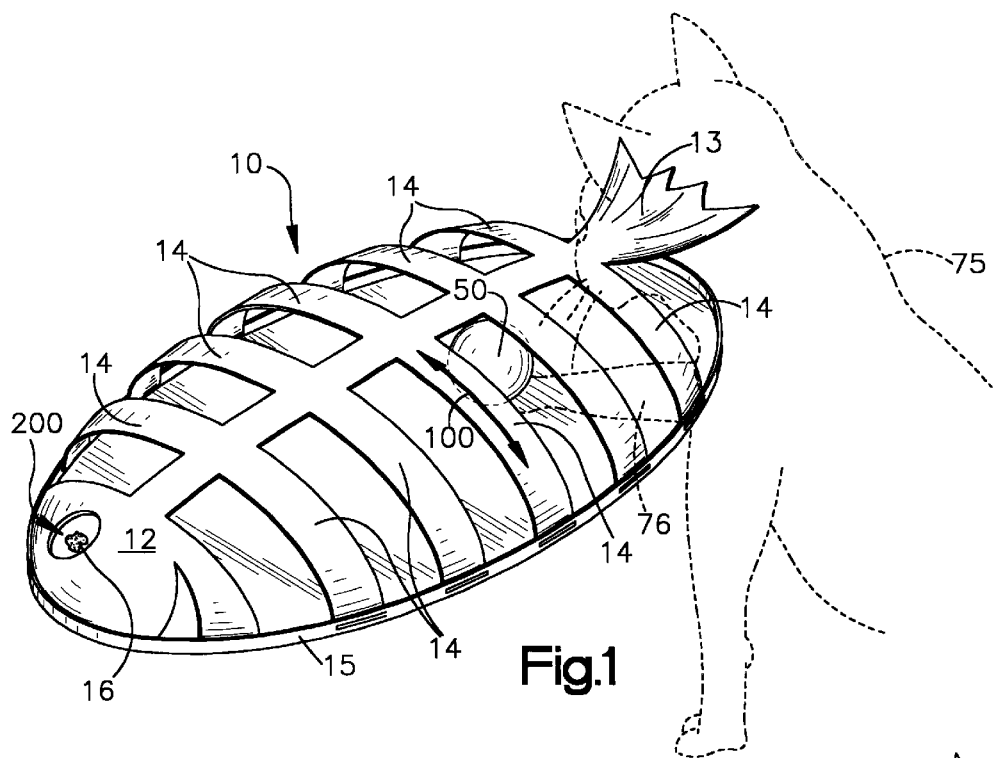
FIG. 1 illustrates a perspective view of the preferred embodiment, of the multi-apertured feline toy & exercise device.

Referring now to the drawings, there is illustrated in FIG. 1 a perspective view of the preferred embodiment, of the invention, generally designated 10.

A light-weight target object 50, such as a ping-pong ball, of a fixed diameter is placed within the device. A plastic semi-rigid raised central elongated spline 11 with a representational fish head 12 and tail 13 molded as part of or affixed thereto, form a support structure for a plurality ribs 14 each rib with one end affixed substantially perpendicular to the elongated spline 11 and which extend and arch downward and have the second end of each rib affixed to a base 15.

The distance between the edges of the ribs 14 is maintained at a distance less than the corresponding diameter of the target object 50 preventing removal of the ball 10 yet allowing the target object 50 to ride along the edges of any two ribs 14 and be lifted or rolled upward along the line of arrow 100. The distance between the representational head 12 or tail 13 and the adjacent rib 14 is also maintained at a distance less than the corresponding diameter of the target object 50. During play, a cat 75 may insert one or more of its paws 76 into the device 10 to attack the target object 50.

The base 15 may be raised (not shown) in the center and descend downward towards the periphery thereby urging the rolling of the target object 50 towards the periphery. A natural cat attractant 200 such as catnip may be placed within the depression 16 forming the representational "fish eye". Separately and in combination the unrestricted internal rolling to the target object 50, the movement of the target object 50 upward, along the line of arrow 100, the erratic rolling of the target object 50 caused by the raised base 15 and the attractant 200 will provoke the cat's curiosity which may result in prolonged play with the device.

Figure 2:
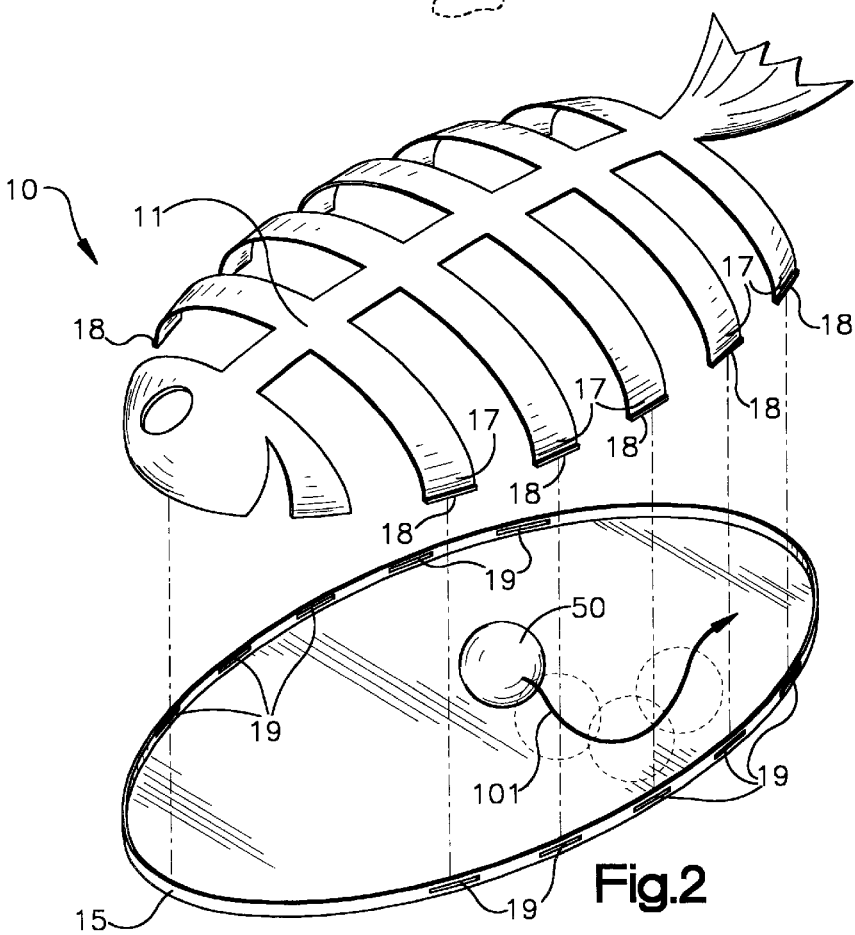
FIG. 2 illustrates an assembly view of the preferred embodiment of the multi-apertured feline toy & exercise device.

Referring now to FIG. 2, there is illustrated an assembly view of the device 10. A the free end 17 of each rib 14 a perpendicular projection 18 forming a latch is extended of a size and shape corresponding to a catch 19 located at the periphery of the base 15. The base 15 slopes downward from the center thereby urges the target object 50 to move along the line of arrow 101 if allowed to freely roll from the center downward. Assembly is accomplished by placing the target object 50 on the base and then snapping the latches 18 into the catches 19.

Referring now to FIG. 3, there is illustrated a cut-away side view of another embodiment of the base 15 of the multi-apertured feline toy & exercise device, generally designated 20.

The contours of the base 20 form both depressions 21 and ridges 22 so that a rolling target object 50 will move in a more erratic fashion along the line of arrow 102.

Referring now to the drawings, there is illustrated in FIG. 4 a perspective view of an alternate embodiment of the invention, generally designated 30.

A multi-apertured cylindrical tube, which will roll across a floor during play (not shown) is formed by the perpendicular attachment to the top of two central elongated splines 31 of a plurality of top, arch shaped, ribs 32a and the perpendicular attachment to the bottom of the two central elongated splines 31 of a plurality of bottom, arch shaped, ribs 32b. The ribs 32a & 32b are affixed to the elongated splines 31 at a pre-determined distance apart which is less than the rolling target object's 50 diameter.

The front of the cylinder formed by the splines 31 and ribs 32a & 32b is sealed by an oval front wall 33 which extends above the top ribs 32a. Affixed perpendicular to the front wall 33 is a representational head 34. The roughly circular back end of the cylindrical tube formed by the two sets of ribs 32a & 32b affixed to the splines 31 is sealed by an oval back wall 35. Affixed perpendicular to the front wall 35 is a representational tail 36.

When the cat (not shown) attacks the internal target object 50, the device 30 will roll across the ground, erratically moving the target object 50 due to the see-saw effect caused by the uneven rolling edge formed by the oval front and back walls 33 & 35. Additional enticement for the cat to is generated by the roaming head and tail which are essentially planar and cue a cat's visual response.

To further entice a cat to play on its own one or more secondary target objects 40 may be affixed to the external surface of the device 30. When the device is rolling across the floor during play with the internal target object 50 (not shown) the secondary target objects 40 will also move with the device 30.

A interchangeable secondary target object 40 may be affixed with a elastic, or nonelastic tether 37, through a tether mount 38 and tied off 39. A interchangeable secondary target object 40 may be affixed via a ball chain through a semi-rigid snap-in ball chain guide 42, of a size and shape allowing the ball chain 41 to be positively snapped into.

Referring now to the drawings, there is illustrated in FIG. 5A a side view of an alternate embodiment of the invention, generally designated 60.

A multi-apertured cylindrical tube, which will roll across a floor during play (not shown) is formed by the perpendicular attachment to the top of two central elongated splines 61 of a plurality of top, arch shaped, ribs 62a and the perpendicular attachment to the bottom of the two central elongated splines 61 of a plurality of bottom arch shaped, ribs 62b. The free end of each rib 62a & 62b is affixed to the elongated splines 61 at a pre-determined distance apart which is less than the rolling target objects 50 diameter.

The roughly circular front end of the cylindrical tube, formed by the two sets of ribs 62a & 62b affixed to the splines 61 with a rolling target object 50 placed therein, is sealed by a circular front wall 63. A material 64 which is suitable for clawing by a cat, such as carpet, sofa fabric or sisal rope is affixed around a portion of the cylindrical tube and supported by the scratch surface guide (not shown). Affixed perpendicular to the front wall 63 is a representational head 65.

The roughly circular back end of the cylindrical tube, formed by the two sets of ribs 62a & 62b affixed to the splines 61 is sealed by a roughly circular back wall 66. Affixed perpendicular to the back wall 66 is a representational tail 67.

Formed as part of the representational head is a catnip reservoir for placing catnip or other natural cat attractant within (not shown). A dispenser cover 68 is removably affixed over the receiving dispensing intention.

When the cat (not shown) attacks the internal target object 50, the device 60 will roll across the ground, and catnip or other cat attractant will be dispensed from the refillable catnip receiving dispensing indentation.

Referring now to the drawings there is illustrated in FIG. 5B a cut-away view, along line A—A of FIG. 5A, generally designated 60.

The alternating top arched shaped ribs 62a and bottom, arch shaped, ribs 62b extend perpendicular from a central elongated spline 61. Between the circular front wall 63 and the arched shaped ribs 62a & 62b a scratch surface guide formed by narrower more closely spaced arched shaped ribs 69a & 69b. Wound and glued to the outer surface of the scratch surface guide is a length of sisal rope providing a suitable alternative to a sofa arm for a cat to scratch.

The catnip reservoir is formed by a receiving and dispensing indentation 70 molded as part of the representational head 65, for placing catnip 71 or other natural cat attractant in. The controlled dispensing is regulated by a series of dispensing channels 72 formed through the catnip receiving dispensing intention 70. The dispenser cover 68 forms a cap which may removably inserted into dispensing intention 70 to allow the catnip 71 to be replaced.

Since certain changes may be made in the above apparatus without departing from the scope of the invention therein involved, it is intended that all matter contained in the above description as shown in the accompanying drawing, shall be interpreted in an illustrative, and not a limiting sense.

What is claimed is:

1. A feline toy and exercise device, comprising:
   a) one or more balls of a pre-determined diameter;
   b) an elongated central spline;
   c) a plurality of elongated rib splines with a first end affixed essentially perpendicular to said elongated central spline and spaced apart by a diameter less than the diameter of said ball, so that when a cat attempts to pass said ball between any two of said elongated splines, said ball will be restricted, and a second end;
   d) a planar base; and,
   e) a means for affixing said second ends of said elongated splines to said base whereby the said first ends, affixed to said elongated central spline, and said elongated spline, are raised above said base, forming a roughly a dome shape structure with a plurality of elongated vertical arched apertures which restrict passage of said ball yet allow entrance of a cat's paws, and allow for movement of said ball, when lifted by a cat, off said base and upward towards said central elongated spline, thereby providing additional exercise and amusement which will encourage a cat to play is own.

2. The arrangement according to claim 1, further comprising:
   a) a half dome shaped support affixed to one end of said central elongated forming a representational fish head of a height and size large enough to fully cover said ball; and
   b) an essentially triangular planar surface affixed at one end of said elongated central spline forming a representational fish tail with a rough or scalloped edge provided between the two free corners, which provide a surface for a cat to scratch or groom against.

3. The arrangement according to claim 1, wherein said means for affixing said second ends is a plurality of latches formed as part of said second ends of said elongated splines and a raised annular wall with a plurality of corresponding receiving catches is formed along the edge of said base.

4. The arrangement according to claim 1, further comprising a receiving intention for holding a natural attractant to cats is formed on the outer surface of the device.

5. The arrangement according to claim 1, wherein said base contains a plurality of raised areas and depressions for directing the movement of said ball when it is pushed or rolling on the base.

6. A feline toy and exercise device comprising:
   a) One or more spherical internal target objects of pre-determined diameter;
   b) a multi-apertured substantially cylindrical tube with said internal target objects placed therein further comprising;
      i) a parallel pair of axial elongated central splines;
      ii) a plurality of arch shaped top rib splines, all in the same upward orientation, with a first end affixed essentially perpendicular to said first elongated central spline and spaced apart by a diameter less than the diameter of said internal target objects, and a second end affixed essentially perpendicular to said second elongated central spline;
      iii) a plurality of arch shaped bottom rib splines, all in the same downward orientation, with a first end affixed essentially perpendicular to said first elongated central spline and spaced apart by a diameter less than the diameter of said internal target objects, and a second end affixed essentially perpendicular to said second the elongated central splines; and,
   c) a back cover and a front cover of a size and shape to prevent the removal of said internal target object are affixed over the front and back ends of said cylindrical tube.

7. The arrangement according to claim 6, wherein said front covers is of a target diameter than said back cover thereby the cylindrical be will roll across a floor, in a radius opposite to said target diameter front cover during play.

8. The arrangement according to claim 6, wherein one or both of said covers are ovoid , with a portion thereof protruding beyond the edge of said cylindrical be whereby the ovoid shape will cause said cylindrical tube to oscillate up and down when rolled across a floor during play.

9. The arrangement according to claim 6, further comprising:
   a) one or more external target objects of a size and material suitable for bating and clawing by a cat; and,
   b) an attaching means to removable arch said external target objects to said cylindrical tube.

10. The arrangement according to claim 9, wherein said attaching means is a first ball chain attached to said external target objects and with a free end, and a second ball chain affixed to said cylindrical tube and with a free and a ball chain link attaching both of said free ends of each of said ball chain.

11. The arrangement according to claim 6, further comprising:
   a) one or more cup shaped indentations formed as part of said covers each with one or more small dispensing channels to control the dispensing of a natural cat attractant;
   b) a measure of a natural cat attractant such as cat nip placed within said indentation;
   c) a cap; and,
   d) a means for removably affixing a cap over said cup shaped indentation thereby limiting the dispensing of said natural cat attractant to the dispensing channels.

12. The arrangement according to claim 11, wherein said means for removably affixing said cap is a series of latches and catches of formed detents and projections on said cap and said cup shaped indentation which mate when said cap and said cup shaped indentation are engaged allowing for said cap and said cup shaped indentation to be releasably engaged by snapping together.

13. The arrangement according to claim 11, wherein said means for removably affixing said cap is a series of mating threads formed on said cap and said cup shaped indentation which may be reversible screwed and unscrewed together.

14. The arrangement according to claim 11, further comprising one or more substantially planar projection extending roughly perpendicular from one or more of said covers with said cup shaped indentation and said dispensing channels formed therein.

15. The arrangement according to claim 14, wherein said attaching means is a ball chain attached to said external target objects and a C shaped ball chain guide molded as a part of one or more of said planar projections which forms a mating catch not which said ball chain may be removably latched when a portion of said ball chain is pushed against the open portion of said C shape it ball chain guide.

16. A feline toy and exercise device, comprising:
   a) One or more internal target objects of predetermined diameter;
   b) a multi-apertured substantially cylindrical tube with said internal target objects placed therein further comprising:
      i) a parallel pair of axial elongated central splines;
      ii) a plurality of arch shaped top rib splines, all in the same upward orientation, with a first end affixed essentially perpendicular to said first elongated central spline and spaced apart by a diameter less than the diameter of said internal target objects, and a second end affixed essentially perpendicular to said second elongated central spline;
      iii) a plurality of arch shaped bottom rib splines, all in the same downward orientation, with a first end affixed essentially perpendicular to said first elongated central spline and spaced apart by a diameter less than the diameter of said internal target objects, and a second end affixed essentially perpendicular to said second the elongated central splines;
   c) a back cover and a front cover of a size and shape to prevent the removal of said internal target object are affixed over the front and back ends of said tube; and,
   d) a scratching means of a material attractive to cats affixed around a portion of said cylindrical tube.

17. The arrangement according to claim 16, further comprising:
   a) a length of sisal rope of a fixed diameter; and,
   b) a scratching surface guide formed, as part of said cylindrical tube, of a plurality of narrow arch shaped top rib splines, all in the same upward orientation, and a plurality of narrow arch shaped bottom rib splines, all in the same downward orientation, each with a first end affixed essentially perpendicular to said first elongated central spline and separated by distance less than diameter of said rope, and a second end affixed essentially perpendicular to said second elongated central spline forming the top half of a guide for coiling said sisal rope, around.

18. The arrangement according to claim 16, wherein said scratching means is selected from the group consisting of cardboard, corrugated cardboard, pressed paper, fabric, rope, or carpet.

* * * * *